(12) United States Patent
Byron

(10) Patent No.: US 6,215,929 B1
(45) Date of Patent: Apr. 10, 2001

(54) DISPERSION COMPENSATING WAVEGUIDE FOR OPTICAL TRANSMISSION SYSTEMS

(75) Inventor: Kevin Christopher Byron, Herts (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/214,448

(22) PCT Filed: Jul. 3, 1997

(86) PCT No.: PCT/GB97/01783

§ 371 Date: Dec. 29, 1998

§ 102(e) Date: Dec. 29, 1998

(87) PCT Pub. No.: WO98/01781

PCT Pub. Date: Jan. 15, 1998

(30) Foreign Application Priority Data

Jul. 6, 1996 (GB) .................................................. 9614244

(51) Int. Cl.[7] .................................................. G02B 6/34
(52) U.S. Cl. ................. 385/37; 385/15; 359/173
(58) Field of Search .................. 385/27, 31, 37, 385/38, 39, 15, 24; 359/173, 188, 193, 195, 341, 349

(56) References Cited

U.S. PATENT DOCUMENTS

| 5,404,413 | 4/1995 | Delavaux ............................... 385/15 |
| 5,410,624 | 4/1995 | Morkel . |
| 5,574,810 | * 11/1996 | Byron et al. ............................ 385/37 |
| 5,608,562 | * 3/1997 | Delavaux et al. ..................... 359/173 |
| 5,701,188 | * 12/1997 | Shigematsu et al. ................. 359/161 |
| 6,072,811 | * 6/2000 | Fermann et al. ........................ 385/37 |

FOREIGN PATENT DOCUMENTS

| 0 485 100 | 5/1992 | (EP) . |
| 0 559 356 | 9/1993 | (EP) . |
| 0 732 819 | 9/1996 | (EP) . |

* cited by examiner

*Primary Examiner*—Frank G. Font
*Assistant Examiner*—Sang Hoang Nguyen
(74) *Attorney, Agent, or Firm*—Lee, Mann, Smith, McWilliams, Sweeney & Ohlson

(57) ABSTRACT

In order to use one dispersion compensating fiber element for selecting a given value of dispersion, one or more frequency or wavelength dependent optical reflection gratings ($G_1$, $G_2$, $G_3$) is located at such a position along the unit (8) that the double traversal of a section results in a desired value of dispersion at a frequency. A directional coupler (9) diverts the reflected wave to utilization means (10) for its recovery. If a different value of dispersion at the same wavelength, or if some value of dispersion at a different frequency, is required, a reflection grating effective to reflect at the appropriate frequency and at the appropriate position, gives the required values.

6 Claims, 1 Drawing Sheet

DISPERSION COMPENSATING WAVEGUIDE FOR OPTICAL TRANSMISSION SYSTEMS

BACKGROUND OF THE INVENTION

The present invention relates to a dispersion compensating waveguide (DCW), which has the property of introducing frequency dispersion in transmitted optical waves and is generally used for compensating unwanted dispersion in a transmission path usually comprising fibre. The invention further relates to an optical transmission system incorporating a dispersion compensated waveguide.

Typically the waveguide will comprise dispersion compensating fibre ((DCF).

In order that a required dispersion be introduced, without a requirement for unduly long lengths of dispersion compensating fibre, the fibre may be highly doped, e.g. germania doped silica. Whether or not it is highly doped, it is usual to cut or otherwise select an appropriate length to select a dispersion value, which is somewhat inflexible. If more than one wavelength is being used in the transmission of information, there will be an inevitable trade-off in throughput resulting from selecting an optimum length to suit all the wavelengths used.

It would be also desirable if losses could be compensated independently of the compensation of dispersion, or so as to enable use of dispersion compensating fibre to be more flexible.

SUMMARY OF THE INVENTION

A particular arrangement to be described below as being helpful in understanding the invention proposes the provision of Bragg gratings in the dispersion compensating fibre, and makes use of the reflected signals from the gratings. The incident signal traverses selectively different lengths of the dispersion compensating fibre according to the dispersion required by the appropriate positioning of the grating along the dispersion compensating fibre.

If various selected dispersions are required, a prior method is to use dispersion compensating fibres of different lengths, or to cut down from a starting length. This embodiment uses reflection gratings at intervals such that different (double—) lengths of the dispersion compensating fibre can be selected for traversal by the signal, and hence different dispersions can be selected. The selection would be achieved in practice by splicing or writing a grating into the fibre at the required length down the fibre.

In the specification of U.S. Pat. No. 5,404,413 there was proposed an optical circulator with three ports. The first and third ports were connected to optical fibre systems. The second port was connected to a dispersion compensating fibre and return means. A signal passed through the dispersion compensating fibre twice, thus permitting the use of shorter compensating fibres than previously.

The following description and drawings disclose a previously proposed arrangement and, by means of examples, the invention which is characterised in the appended claims, whose terms determine the extent of the protection conferred hereby.

DESCRIPTION OF THE PREFERRED EMBODIMENTS

Figure 1:
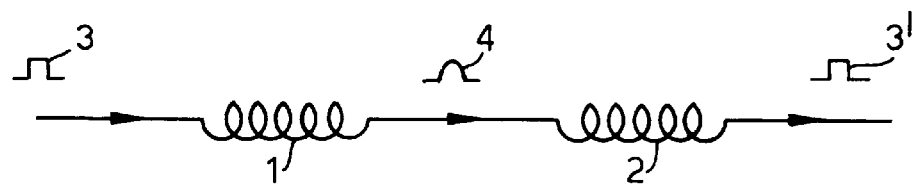
FIG. 1 is a schematic diagram illustrating pulse transmission through a previously proposed optical waveguide in series with a dispersion compensating fibre element for use in explaining the invention.

Referring to FIG. 1, a silica optical fibre waveguide 1 typically exhibits dispersion which distorts transmitted signals having substantial bandwidth. One previously proposed solution which is rather inadequate is to operate at 1.311 m or at whatever wavelength around which dispersion is a minimum. Unfortunately minimum power loss occurs at very different wavelengths from minimum dispersion. Generally, however, a length of dispersion compensating fibre 2 is required in series with fibre 1. Thus, if the correct length of dispersion compensating fibre 2 is inserted, an input pulse of waveform 3 may be broadened to waveform 4 by the transmission fibre 1, and then the distortion is compensated by the correct length of dispersion compensating fibre 2 to recover the original pulse width and shape, as indicated by the approximately square pulse $3^i$ resembling substantially the original waveform 3.

Figure 2:
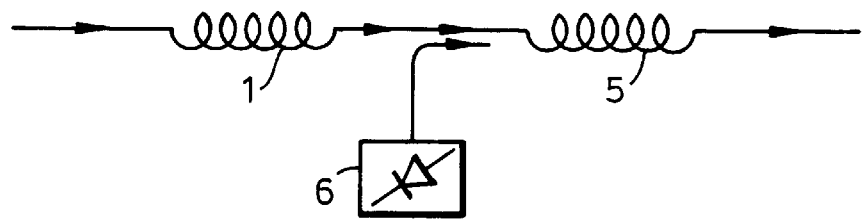
FIG. 2 shows pumping of a dispersion compensating fibre element to enable Raman amplification which may optionally be used in a first embodiment.

An option to compensate for the loss of power uses the fact that Raman scattering increases with increasing germania concentration, so that a conventional dispersion compensating fibre, e.g. of highly doped germania silica, generates an amplified signal from input signals by molecular scattering having a given frequency difference from a pump frequency. FIG. 2 shows this option in which waveguide 1 is compensated for dispersion by the use of dispersion compensating fibre 5. Because the dispersion compensating fibre 5 is lossy, it is pumped by means of a diode laser 6 at a power just enough to cause stimulated Raman gain at a downshifted frequency. Signals at this frequency are amplified, by this Raman effect, and the energy of the pumping determines the amount of Raman amplification. Thus losses in waveguide 1 can just be compensated by Raman amplification in the dispersion compensating fibre 5, for this specific downshifted signal frequency corresponding to the Raman frequency shift.

In one typical sample of dispersion compensating fibre 5, we have calculated that 100 mW of pump power is needed to compensate for the 13.6 dB loss on an 80 kM section of the dispersion compensating fibre 5 (the losses in the section of main waveguide 1 being separately accounted for or compensated for). This calculation assumes a Raman gain of $10^{-12}$ cm/w, and is somewhat conservative in assuming a low germania concentration in the dispersion compensating fibre material. Assuming a higher level of germania dopant concentration, to give a desired high dispersion (or need for only a smaller length), the Raman gain coefficient would also increase, so that pump power could be decreased for the same amplification. The gain bandwidth for Raman amplification is around 10 nm, and Raman amplifiers have the useful property that they give quantum limited noise performance at any gain.

Such Raman amplifiers may be pumped at shorter wavelengths by arranging for intermediate Raman orders to oscillate in a resonator defined by the amplifier A. A second embodiment uses pairs of Bragg gratings in the side of the dispersion compensating fibre, each pair defining a respective cavity along the dispersion compensating fibre, such as to cause oscillations selectively at the respective other orders, and thereby to transfer a substantial amount of the power, at one or more of the unwanted orders, from the pump signal to the desired order to give amplification to the signal. For instance, a diode-pumped Nd:YAG laser transmits 1319 nm wavelength pumping power to a dispersion compensating fibre such as that schematically shown at 5 in FIG. 2. If the required signal amplification is to be at 1.55 µm (i.e. 1550 nm), at which wavelength a standard dispersion compensating fibre is highly dispersive, then certain unwanted orders at 1380 nm and 1460 nm are generated by oscillations and are unrelated to the incident 1.5511 m signal. By the use of spaced grating pairs (not shown) reflective at respective 1380 nm and 1460 nm, oscillatory cavities are set up which transfer the energy at these unwanted wavelengths to energy at a wanted wavelength. This option thus comprises a dispersion compensating fibre including oscillatory cavities defined by reflective gratings at unrequired oscillatory wavelengths unrelated to a required signal wavelength of operation, wherein all these wavelengths, required and unrequired, are or tend to be Raman signals generated by pumping the dispersion compensating fibre, e.g. by means of a standard diode pumped Nd:YAG laser, and the required signal is responsive also to an incident signal and is amplified enough to compensate for losses in the Ddispersion compensating fibre and in line 1. The wanted signal can be recovered from downstream of the reflective grating pair or pairs (not shown).

Figure 3:
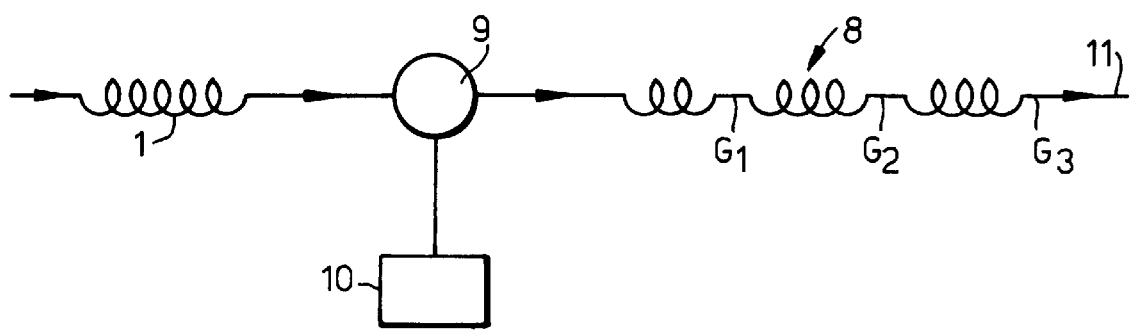
FIG. 3 shows this first embodiment without the pumped option shown in FIG. 2, but with a dispersion compensating fibre unit equipped with multiple distributed reflection elements.

An embodiment of the invention is described with reference to FIG. 3, in which the wanted amplified signal is derived by reflection from an optical grating. In FIG. 3, the dispersion compensating fibre 8 is caused to reflect the wanted signal from optical transmission line 1 to a circulator or other directional coupler 9 and thence to a detector or utilisation circuit 10; unwanted signals may be transmitted through a through-path 11 of the dispersion compensating fibre 8 in FIG. 3. Alternatively all signals may be reflected at 11.

Amplification to compensate for losses if desired may be arranged as in FIG. 2 by pumping and by selected Raman molecular transitions. A problem with dispersion compensating fibre is that of selecting the appropriate length, desirably for economy's sake from a given length, whereby to introduce the appropriate amount of compensation for the dispersion caused by perhaps 50 kM or some unknown length of transmission waveguide 1. One prior proposed way of selecting dispersion compensating fibre lengths is by cutting off sections, which tends to be inconvenient and which for WDM systems results in a compromise in throughput. Accordingly by this embodiment of FIG. 3, reflection points are created at one or more of the positions $G_1$, $G_2$, $G_3$ by means of Bragg gratings of appropriate element spacing which determine reflection wavelength or frequency, and of appropriate grating length which determines bandwidth of wavelength energy reflected, If $G_1$ is operative, the incident signals at this frequency will be selectively reflected at this frequency, and will traverse the first section, shown leftward of dispersion compensating fibre 8, twice, introducing dispersion corresponding to this double length, then leftwards to circulator 9 and branched to utilisation circuit 10. If other dispersions or different wavelengths are to be selected, different reflecting gratings $G_2$ or $G_3$ are used at appropriate positions or appropriate grating element spacings respectively, either of these wavelengths being transmitted past grating $G_1$ with negligible reflection. If grating G1 is likely not to be required, it can be erased in non-destructive manner by heating or irradiation by UV. New radiation gratings G can be added, e.g. they can be spliced in place as required. The position of a grating G determines the dispersion, and the spacing between grating elements in a grating G determines the wavelength selected by reflection.

Raman amplification by pumping the dispersion compensating fibre material will usually be required, as described for FIG. 2, but occasionally may be deemed unnecessary if the dispersion compensating fibre 8 or optical waveguide line 1 does not introduce excessive power losses.

Variations of the arrangement of FIG. 3 may be used in further embodiments to separate energy at different wavelength in wavelength division multiplexers (WDM). The two or more gratings G will be located by splicing in place or otherwise, at appropriate distances down the dispersion compensating fibre 8, to give the requisite equalisation for energy at each of the different wavelengths.

Referring again to FIG. 3, when a Raman pump is used as in FIG. 2, a further reflecting grating (not shown) can be located downstream of the other components of grating element spacing selected to reflect energy at the pump frequency. The reflected energy will reinforce the incident pump energy to result in a higher overall gain.

Another alternative pumping scheme is to locate a pump source at both ends of the dispersion compensating fibre 5 of FIG. 2, when Raman amplification is employed, thus again increasing gain when required.

What is claimed is:

1. A dispersion compensation device including a plurality of wavelength or frequency dependent reflection devices each of which is arranged to reflect signals at a predetermined wavelength, the reflection devices being located in series at predetermined locations along a Raman amplified dispersion compensating waveguide element to reflect signals at the predetermined wavelengths for double passes through, at least a portion of, the waveguide, the location of each reflection device being so chosen as to cause the transmission of a signal at a specific wave-length through a predetermined length of the dispersion compensating waveguide element to compensate for dispersion in the signal and to equalise energy at each of the wavelengths, and a circulator or other directional coupler arranged to branch the reflected signal to a utilisation means.

2. A dispersion compensation device as claimed in claim 1 wherein each reflection device is a diffraction grating.

3. A dispersion compensation device as claimed in claim 2 including fibre grating reflectors arranged to create optical cavities in the dispersion compensating waveguide element whereby energy at unwanted intermediate orders at undesired wavelengths can be transformed to energy at another wavelength, or can be dissipated.

4. Use of the dispersion compensating device claimed in claim 1 wherein unwanted reflection devices are erased, and are replaced by at least one substitute reflection devices, in the dispersion compensating waveguide device, whereby different lengths of double-pass and hence different dispersions can be selected.

5. Use of the dispersion compensating device claimed in claim 4 wherein unwanted reflection devices are erased, and at least one substitute reflection devices, which are gratings of selected element spacing, are spliced in the dispersion compensating fibre device, so that different wanted wavelengths can be selectively reflected.

6. An optical transmission system including a transmission path having first and second parts exhibiting dispersion, the dispersion of the second part compensating for the dispersion of the first part, wherein the second part includes a dispersion compensating device as claimed in claim 1.

* * * * *